(12) United States Patent
Azarov (10) Patent No.: US 7,817,643 B2
(45) Date of Patent: Oct. 19, 2010

(54) SYSTEM AND METHOD FOR VARYING THE SCHEDULING OF REAL TIME PROTOCOL (RTP) PACKETS

(76) Inventor: Maksim Azarov, 260 Carlton Club, Piscataway, NJ (US) 08854

( * ) Notice: Subject to any disclaimer, the term of this patent is extended or adjusted under 35 U.S.C. 154(b) by 866 days.

(21) Appl. No.: 10/940,940

(22) Filed: Sep. 14, 2004

(65) Prior Publication Data

US 2006/0056432 A1    Mar. 16, 2006

(51) Int. Cl.
H04L 12/56    (2006.01)
(52) U.S. Cl. .................. 370/395.42; 370/412; 370/461; 370/468
(58) Field of Classification Search .................. 370/394, 370/395.71, 412–418, 429, 440, 537, 538, 370/540, 263, 280, 294, 314, 321, 326, 330, 370/336, 345, 376, 395.4, 436, 442, 458, 370/459, 460, 478, 498, 508, 519
See application file for complete search history.

(56) References Cited

U.S. PATENT DOCUMENTS

| | | | | |
|---|---|---|---|---|
| 4,843,606 A * | 6/1989 | Bux et al. ................... 370/455 |
| 5,119,374 A * | 6/1992 | Firoozmand et al. ........ 370/455 |
| 5,771,234 A * | 6/1998 | Wu et al. ..................... 370/418 |
| 5,896,375 A * | 4/1999 | Dent et al. ................... 370/347 |
| 5,959,981 A * | 9/1999 | Bruckert et al. ............. 370/331 |
| 6,014,707 A * | 1/2000 | Miller et al. ................. 370/252 |
| 6,262,986 B1 | 7/2001 | Oba et al. |
| 6,330,222 B1 * | 12/2001 | Ebisawa ...................... 370/230 |
| 6,337,860 B1 * | 1/2002 | Wicklund .................... 370/417 |
| 6,393,007 B1 * | 5/2002 | Haartsen ...................... 370/337 |
| 6,404,756 B1 * | 6/2002 | Whitehill et al. ............ 370/338 |
| 6,510,322 B1 * | 1/2003 | Schulte-Kellinghaus .... 455/450 |
| 7,042,883 B2 * | 5/2006 | Fan et al. ................. 370/395.4 |
| 7,092,360 B2 * | 8/2006 | Saint-Hilaire et al. ....... 370/412 |
| 7,149,227 B2 * | 12/2006 | Stoler et al. ................. 370/442 |
| 7,177,279 B2 * | 2/2007 | Kataria ....................... 370/412 |
| 7,359,968 B1 * | 4/2008 | Ng et al. ..................... 370/329 |
| 7,382,782 B1 * | 6/2008 | Ferguson et al. ....... 370/395.41 |
| 7,383,349 B2 * | 6/2008 | Lodha ......................... 370/412 |
| 7,580,387 B2 * | 8/2009 | Kayama et al. ............. 370/329 |
| 2002/0042836 A1 | 4/2002 | Mallory |
| 2002/0067709 A1 * | 6/2002 | Yamada et al. .............. 370/337 |
| 2002/0141416 A1 * | 10/2002 | Merani et al. ............ 370/395.4 |
| 2003/0112814 A1 * | 6/2003 | Modali et al. ............... 370/412 |
| 2003/0206521 A1 * | 11/2003 | Qiao .......................... 370/230 |
| 2004/0062276 A1 * | 4/2004 | Uhlik et al. ................. 370/389 |
| 2004/0095885 A1 * | 5/2004 | Yang ....................... 370/235.1 |

(Continued)

FOREIGN PATENT DOCUMENTS

WO    WO 95/12947    5/1995

(Continued)

Primary Examiner—Gregory B Sefcheck
Assistant Examiner—Joshua Smith
(74) Attorney, Agent, or Firm—Stolowitz Ford Cowger LLP (57) ABSTRACT

Apparatus and a method for transmitting a plurality of streams of data packets through a computer network assigns queued packets from each of the plurality of data streams to respective slots in scheduling windows such that queued packets from respective ones of the plurality of data streams occupy different slots in respectively different ones of the scheduling windows. The packets are transmitted through the network in the order defined by the scheduling windows.

13 Claims, 7 Drawing Sheets

U.S. PATENT DOCUMENTS

| | | | |
|---|---|---|---|
| 2004/0131014 A1* | 7/2004 | Thompson et al. | 370/312 |
| 2004/0141482 A1* | 7/2004 | Zeira et al. | 370/335 |
| 2004/0146060 A1* | 7/2004 | Deleam et al. | 370/412 |
| 2005/0058135 A1* | 3/2005 | Sisto et al. | 370/395.2 |
| 2005/0086362 A1* | 4/2005 | Rogers | 370/395.4 |
| 2005/0152329 A1* | 7/2005 | Krishnan et al. | 370/345 |
| 2005/0226263 A1* | 10/2005 | Panigrahy et al. | 370/419 |

FOREIGN PATENT DOCUMENTS

| | | |
|---|---|---|
| WO | WO 00/78000 A2 | 12/2000 |
| WO | WO 03/101073 A1 | 12/2003 |
| WO | WO 2004/056082 A2 | 7/2004 |

* cited by examiner

SYSTEM AND METHOD FOR VARYING THE SCHEDULING OF REAL TIME PROTOCOL (RTP) PACKETS

FIELD OF THE INVENTION

The present invention concerns the streaming of multiple packet streams over a local area network and in particular to balancing the network behavior of multiple real time protocol (RTP) streams.

BACKGROUND OF THE INVENTION

When an RTP scheduler selects which packets to send, it typically processes the streams in one-by-one order, according to either a round-robin scheme, in which each stream has equal priority, or some prioritized scheme in which streams having higher priority are scheduled with greater frequency than those with low priority. When the network becomes congested, however, these types of scheduling may present problems, in particular, the last-scheduled stream may experience a larger number of dropped packets than earlier transmitted streams.

To understand how this may happen, consider the transmission of three streams from a home server to two audio/video (A/V) clients using real-time protocol/real time streaming protocol (RTP/RTSP) in a network that is composed of an Ethernet® portion and a wireless portion. In this example, the wireless portion has a limited bandwidth and is accessed from a wireless access point (AP) on the Ethernet network. In this example, congestion may occur at the bridge between the Ethernet portion and the wireless portion of the network.

In the exemplary system, it is assumed that three RTP streams having the same constant bit-rate are to be sent from the wired network to respective wireless AV devices coupled to the network via the AP. In this simplified example, it is also assumed that these packets are the only traffic on the network between the wired and wireless portions. The scheduler is coupled to all three of the RTP sources and schedules the packets for transmission over the network. The scheduling of the packets occurs at known time intervals with a granularity that is determined by clock parameters of the scheduler. In an exemplary operating system (e.g. Microsoft® Windows,®) the granularity of the transmission interval is, in general, larger than one millisecond, which is much larger than a typical Ethernet packet. For example, a 100 Mbps Ethernet network typically transmits packets having a maximum size of about 1.5 KB. This packet may be transmitted in less than one-tenth of a millisecond. Consequently, the sequence of packets may appear as shown in FIG. 1.

Figure 1:
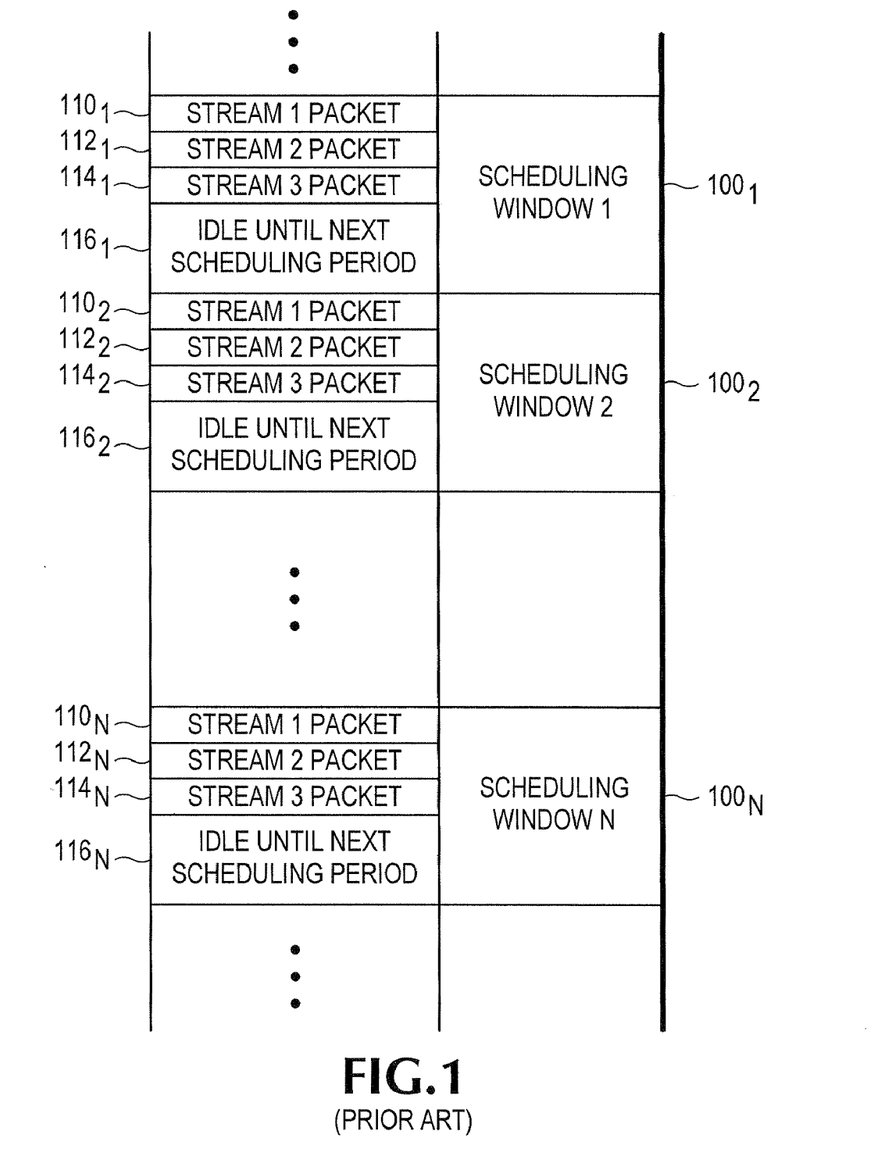
FIG. 1 is a scheduling diagram of a prior art scheduling algorithm.

FIG. 1 shows N scheduling windows ($100_1$ through $100_N$). Packets for stream 1 (110), stream 2 (112) and stream 3 (114) are sequentially scheduled in respective slots at the start of each scheduling window. In this example, following the stream 3 packet, the scheduling window is idle until the next scheduling period (116). The server transmits the scheduled packets during the next transmission interval. This example assumes that a backlog of queued packets exists at all times. In other words, the scheduler schedules "expired" packets, that is to say packets that should have been sent prior to the current moment and are now queued for transmission. While this scheduling algorithm typically works well for maintaining streaming rates for multiple streams, it may not operate well in a congested network. This is because different streams may experience different levels of dropped packets when, for example, the streams are sent at a higher rate than can be absorbed by the wireless portion of the network. In particular, the third stream may have more gaps because its packets are more likely to experience a full buffer at the wireless bridge than packets of the first or second streams. Although the exemplary embodiments show only one expired packet for each stream being scheduled during a scheduling window, depending on the maximum data rate of each stream, it is contemplated that multiple packets from a data stream may be scheduled during each scheduling window.

Another way to view the problem is to consider a congested network in having a router with a limited buffer queue for incoming packets. In this network if batches of packets are sent in order by first stream, second stream and third stream, then the first stream will be the least likely to experience packet loss and the third stream will be the most likely to experience packet loss. This may be seen, in the exemplary buffer of FIGS. 2A through 2F. These Figures shows a buffer 200 at various points in time after receiving packets as transmitted using the scheduling algorithm shown in FIG. 1. This exemplary buffer 200 is a first-in-first-out (FIFO) buffer that is filled from the top and emptied from the bottom. In this example, the buffer is temporarily congested such that, during the time interval covered by the buffer diagrams of FIGS. 2A through 2F, two packets are fetched from the buffer 200 in the time that one batch of three packets is received. The operation of this buffer is simplified in order to illustrate the problem addressed by the subject invention. It does not, for example, take into consideration the transfer of packets from other sources to the wireless network via the network bridge. It also assumes that the three data streams have equal data rates. These simplifications are assumed to clarify the explanation of the problem. The illustrated level of congestion is extreme, as one of every three packets is dropped. In a typical congested network the drop rate may be much less, for example one packet in 10 or one packet in 100.

Figure 2A:
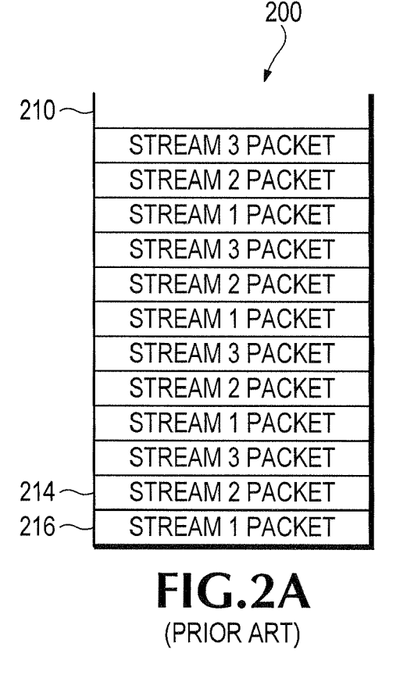
FIGS. 2A, 2B, 2C, 2D, 2E and 2F are memory diagrams showing the state of a router buffer in response to the prior art scheduling algorithm shown in FIG. 1.
Figure 2B:
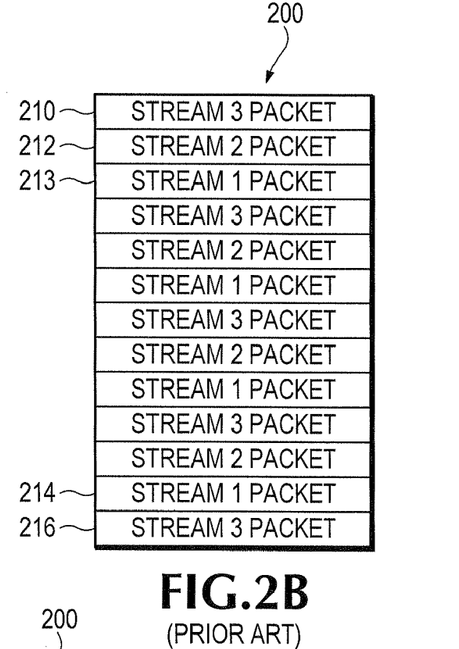
Figure 2C:
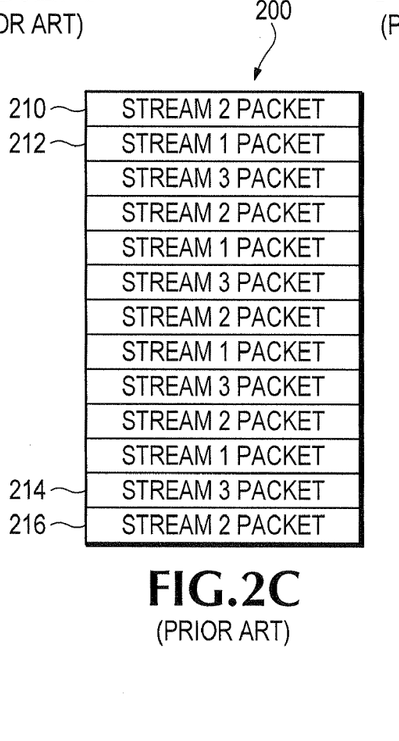
Figure 2D:
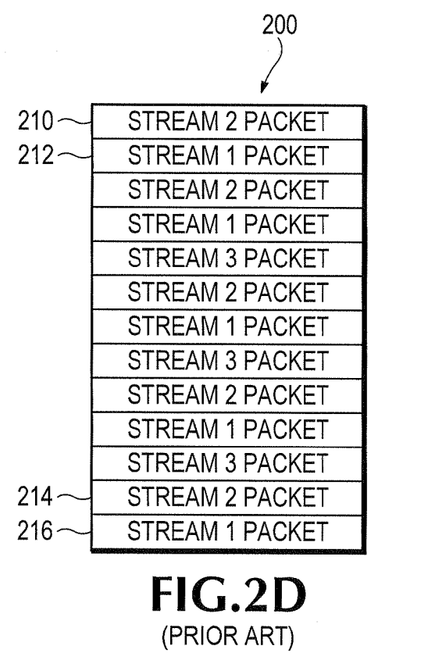
Figure 2E:
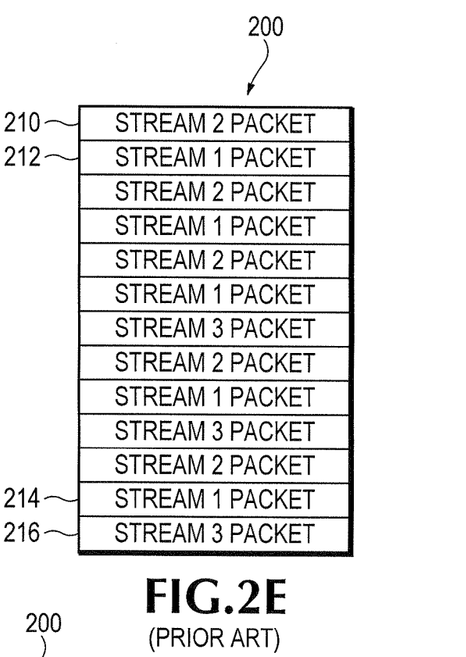
Figure 2F:
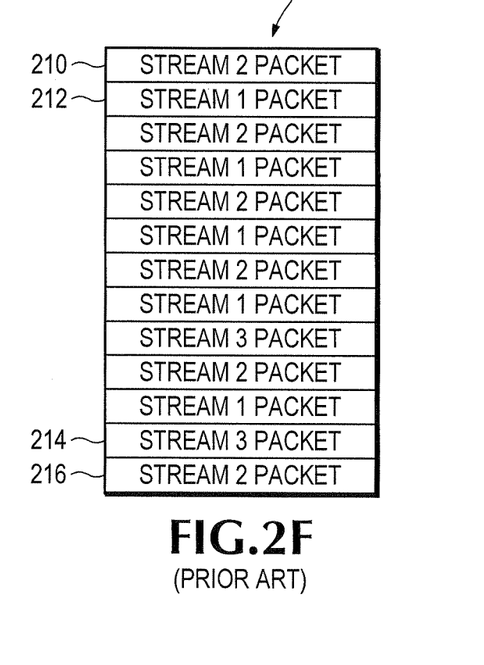

FIG. 2A shows the buffer 200 with one available slot 210. In FIG. 2B, two packets have been removed from buffer slots 214 and 216 and the remaining packets have been shifted down, leaving space to store three new packets in slots 213, 212 and 210. As shown in the Figure, the stream 1 packet is received first, followed by the stream 2 and stream 3 packets. FIG. 2C illustrates the buffer 200 after the next batch of packets has been received. As before, two packets are removed from slots 214 and 216 of the buffer 200 and the remaining packets have been shifted down. This leaves only two slots 210 and 212 to receive the next batch of three packets. As shown in FIG. 2C, the stream 1 packet is stored into slot 212 and the stream 2 packet is stored in slot 210. The stream 3 packet (not shown) can not be received because the buffer 200 is full. Thus, the stream 3 packet is dropped. FIGS. 2D, 2E and 2F show the buffer at subsequent time intervals. During each time interval, two packets have been fetched from the buffer while a batch of three packets arrived to be stored. In each of these Figures, one packet must be dropped and in all cases, it is the packet for stream 3. Thus, this scheduling scheme applied to the exemplary simplified buffer system effectively drops stream 3 entirely.

SUMMARY OF THE INVENTION

The present invention is embodied in apparatus and a method for transmitting a plurality of streams of data packets through a computer network. According to this method, queued packets from each of the plurality of data streams are assigned to respective slots in scheduling windows such that queued packets from respective ones of the plurality of data streams occupy different slots in respectively different ones of the scheduling windows. The packets are transmitted through the network in the order defined by the scheduling windows.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures.

DETAILED DESCRIPTION OF THE INVENTION

Figure 3:
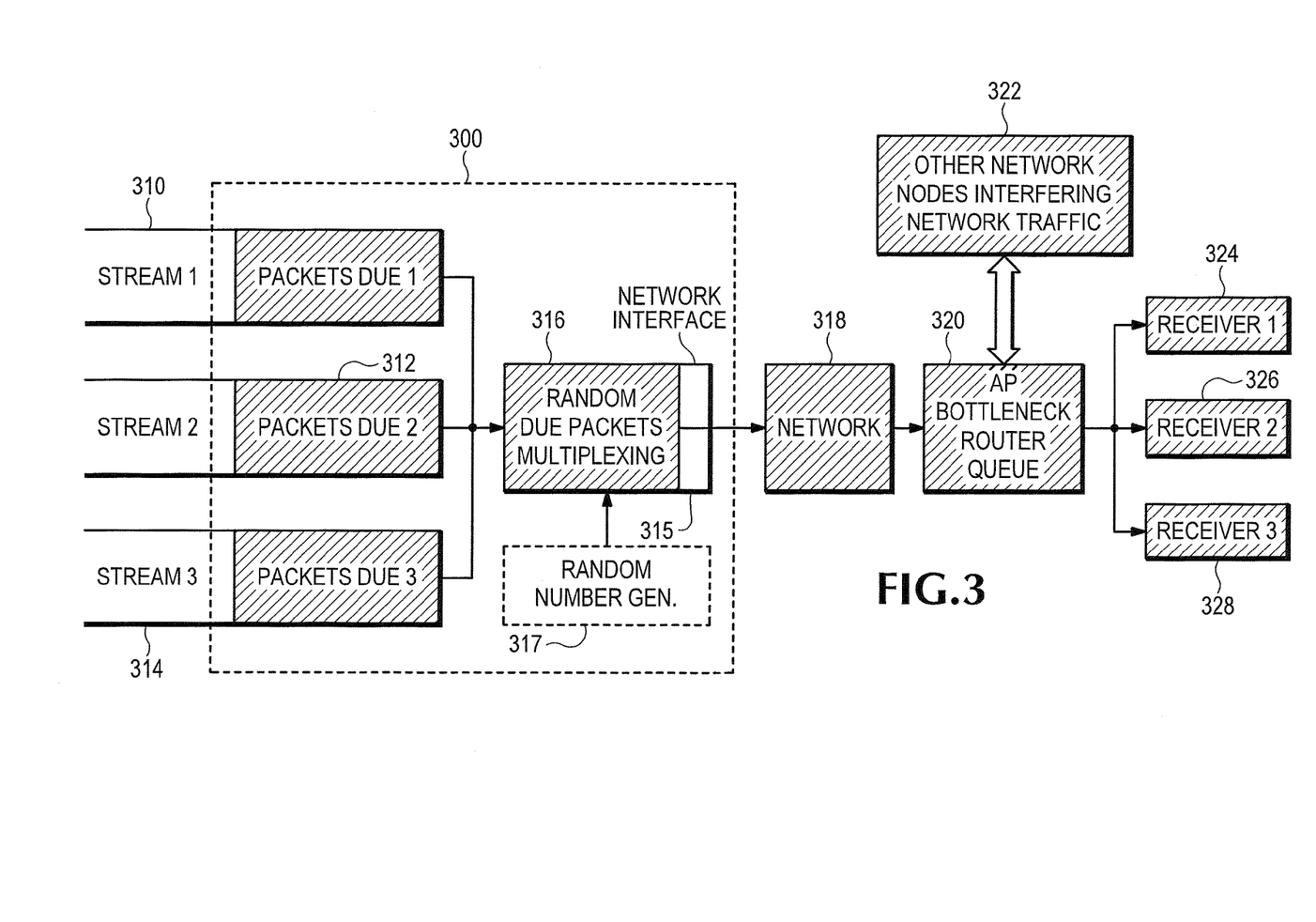
FIG. 3 is a functional block diagram of a system according to the present invention.

FIG. 3 is a functional block diagram of an exemplary home network in accordance with the present invention. As shown in FIG. 3, three streaming sources 310, 312 and 314 provide RTP packet streams to the network via the network interface 317 of a server 300. The RTP packets are streamed onto the network. Because multiple streams are provided concurrently and because the home network has a limited bandwidth each stream includes packets that are currently being provided by the streaming source 310, 312 and 314 as well as queued packets that are overdue. These queued packets are labeled as "packets due" for the sources 310, 312 and 314, shown in FIG. 3.

The queued packets provided by the various streams are applied to block 316 which schedules the packets for the streams in varying order before they are sent onto the network 318. The packets are provided to the network 318 via the network interface 317 which, in turn, provides them to the router queue of the AP 320. The AP, in turn, provides the packets for streams 1, 2 and 3 to the receivers 324, 326 and 328 respectively. Also applied to the router 320 are packets from other network nodes and, in a multi-network environment the AP 320 may also receive packets from other wireless networks. Although the router is shown as being a part of the AP, it is contemplated that it may be separate from the AP and that the router may serve several APs (not shown).

In one exemplary embodiment of the invention, the order of the packets in each scheduling window is randomly assigned by the packet scheduler 316, responsive to an optional random number generator 317 (shown in phantom). In another exemplary embodiment, the order of the packets is changed according to a fixed algorithm. Because the packets for any stream may occur in various slots in the scheduling window, dropped packets are shared among the streams, resulting in better overall performance.

Figure 4:
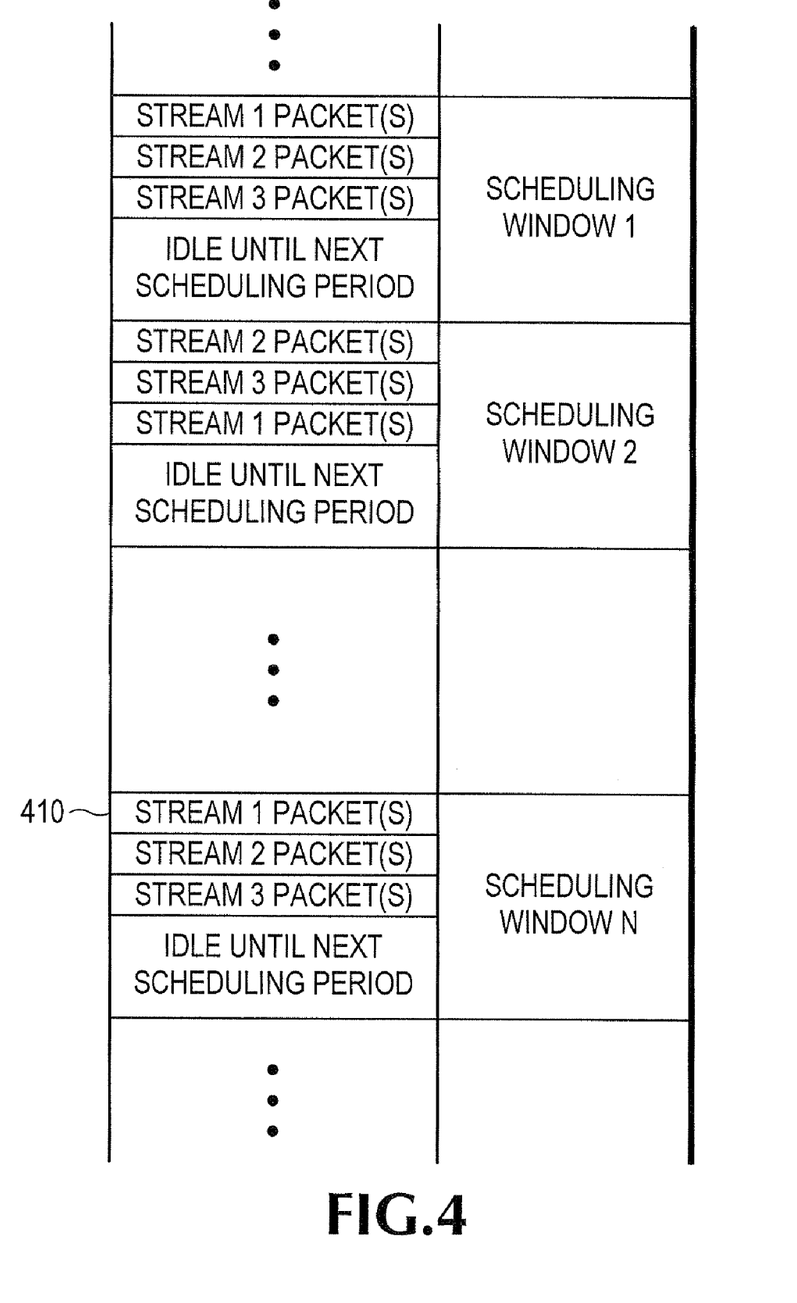
FIG. 4 is a scheduling diagram of an exemplary scheduling algorithm according to the present invention.
Figure 5A:
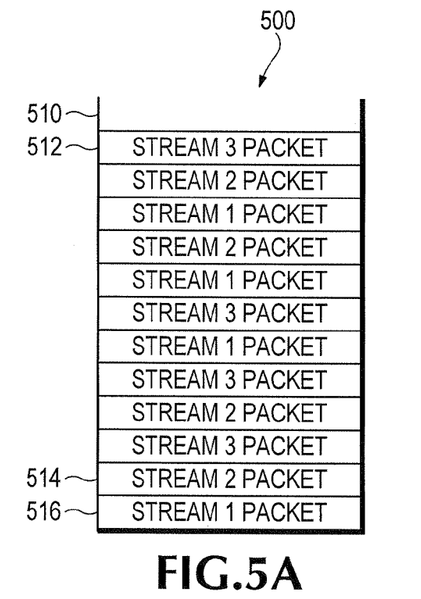
FIGS. 5A, 5B, 5C, 5D, 5E and 5F are memory diagrams showing the state of a router buffer in response to the exemplary scheduling algorithm shown in FIG. 4.
Figure 5B:
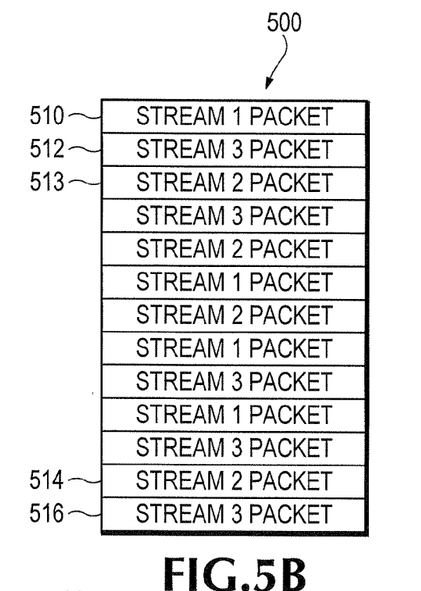
Figure 5C:
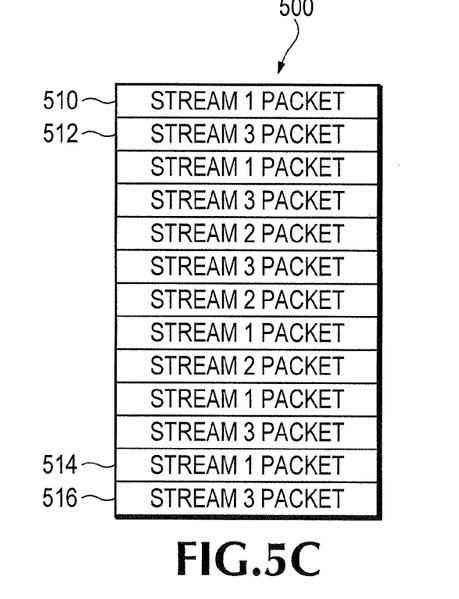
Figure 5D:
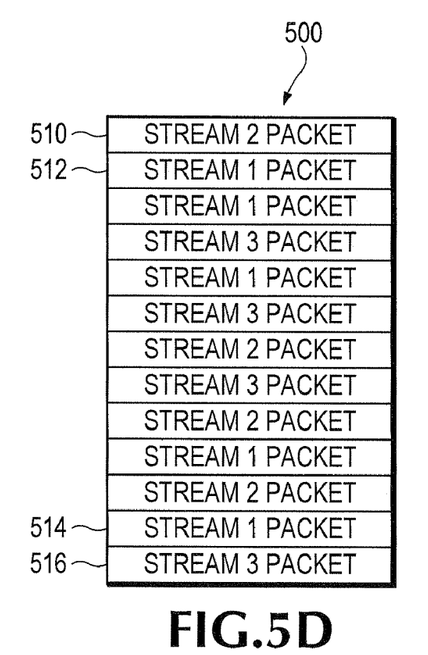
Figure 5E:
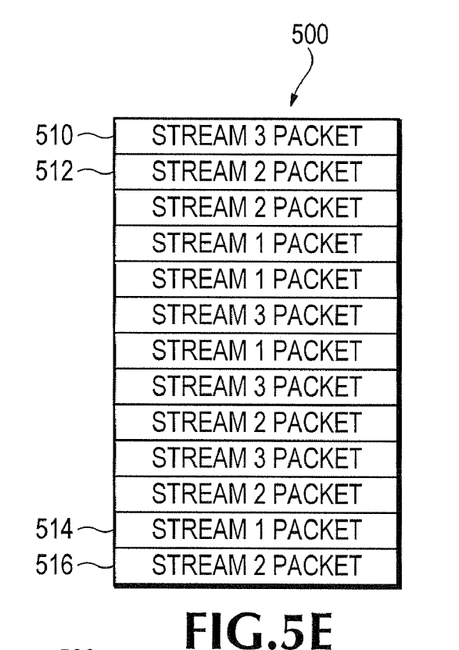
Figure 5F:
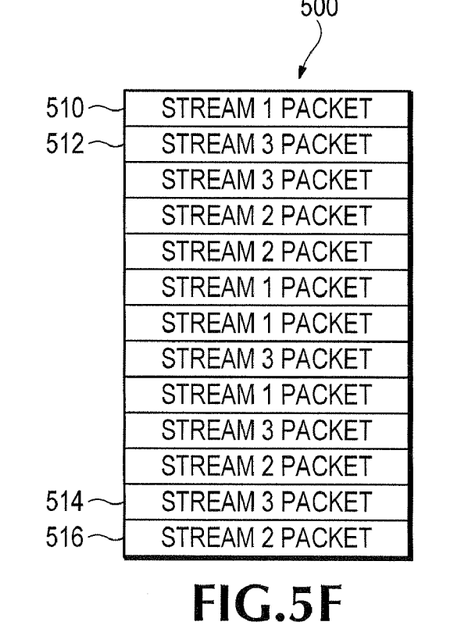

The operation of the algorithm is shown in FIGS. 4-5F. The scheduling algorithm shown in FIG. 4 changes the order of the packet streams according to a round-robin algorithm. As shown in FIG. 4, the scheduler 316 changes the order of the packets from stream 1, stream 2, stream 3 in respective slots of the first scheduling window, to stream 2, stream 3, stream 1 in the corresponding slots for the second scheduling window, to stream 3, stream 1, stream 2 for the third scheduling window (not shown) and so on. The sequence repeats every three scheduling windows as shown for the nth scheduling window. Although FIG. 4 shows the scheduler 316 scheduling one packet per slot, it is contemplated that the scheduler may schedule more than one packet for a particular stream in each scheduling slot. Thus, for example, instead of scheduling one packet from stream 1 in the first slot 410, the scheduler 316 may schedule multiple packets from stream 1 in the slot. In the exemplary embodiment of the invention, however, packets from only one stream are scheduled in any one scheduling slot.

The router buffer produced by the scheduling algorithm shown in FIG. 4 is illustrated by FIGS. 5A through 5F. For the sake of simplicity, the exemplary buffer shown in FIGS. 5A through 5F operates in the same way as the exemplary buffer described above with reference to FIGS. 2A through 2F; it is temporarily congested such that it provides two packets to the wireless network in the time that it receives three packets from the wired network. FIG. 5A shows the buffer 500 with one available slot 510. As can be seen from the packets in the buffer 500, the packets have arrived at the buffer in the round-robin changing order, described above with reference to FIG. 4. In the packet transmission time corresponding to each scheduling interval, one packet from each of the three streams is received and stored into the buffer. In FIG. 5B, two packets have been removed from buffer slots 514 and 516 and the remaining packets have been shifted down, leaving space to store three new packets in slots 513, 512 and 510. As shown in the Figure, the stream 2 packet is received first, followed by the stream 3 and stream 1 packets. FIG. 5C illustrates the buffer 500 after the next batch of packets has been received. As before, two packets are removed from slots 514 and 516 of the buffer 500 and the remaining packets have been shifted down. This leaves only two slots 510 and 512 to receive the next batch of three packets. As shown in FIG. 5C, the stream 3 packet is stored into slot 512 and the stream 1 packet is stored in slot 510. The stream 2 packet (not shown) can not be received because the buffer 500 is full. Thus, the stream 2 packet is dropped.

In FIG. 5D, two packets have been removed from the bottom of the buffer and three packets have arrived. According to the round-robin schedule varying algorithm, these packets are from stream 1, stream 2 and stream 3. Because the buffer only has two empty slots, however, only the packets from stream 1 and stream 2 are stored in slots 512 and 510 of the buffer 500. FIG. 5E shows the buffer after the next batch of packets has been received. Again, only two packets have been fetched from the buffer while three packets have been provided for storage. According to the round-robin algorithm, these packets are from steam 2, stream 3 and stream 1. In this instance, as shown in FIG. 5E, it is the packet from stream 1 that is dropped. Finally, FIG. 5F shows the state of the buffer after the next time interval. As shown in this Figure, packets from stream 3, stream 1 and stream 2 are received but only the packets from stream 3 and stream 1 are stored. The packet from stream 2 is dropped.

As can be seen from the buffer diagrams of FIGS. 5A through 5F, the round-robin scheduling varying scheme is more fair than the prior art scheduling algorithm, described above with reference to FIGS. 1 and 2A through 2F. Using the round-robin schedule changing algorithm, each stream experiences dropped packets but all streams continue to be received. For streaming media such as voice over Internet protocol (VoIP), which transmit data using UDP/IP, in which there is no provision for recovering dropped packets, the exemplary algorithm described above with reference to FIGS. 4 and 5A through 5F may be preferred as the signals received at each of the receivers 324, 326 and 328 (shown in FIG. 3) may still be intelligible even though each stream experiences dropped packets. Using the prior art fixed scheduling algorithm, by contrast, stream 3 is lost entirely so receiver 328 does not receive any signal.

As an alternative to the round-robin schedule changing algorithm, described above, other deterministic schemes may be used as long as the packets in scheduling windows are evenly distributed among the available slots. Furthermore, it is contemplated that the order of the packets in each scheduling window may be changed randomly or pseudo-randomly. In this embodiment of the invention, the random number generator 317 controls the packet scheduler 316 to randomly change the order of the packets in each scheduling window. If the random number generator controls the packet scheduler to equally distribute packets from the various streams among the slots in the scheduling window, the dropped packets resulting from network congestion will be equally distributed among the streams. It is contemplated that the random number generator may be a pseudo-random number generator implemented using a linear feedback shift register as is well known or it may be a true random number generator that may be implemented, for example, using circuitry that amplifies electrical noise to generate random data values.

Furthermore, it is contemplated that the scheme outlined above may be modified to implement a priority scheme while still ensuring that at least some packets from each stream are received. To implement a priority scheme using round-robin schedule changing algorithm described above, for example, packet schedules may be modified by inserting fixed packet schedules among the changing schedules. For example, the round robin algorithm 1,2,3; 2,3,1; 3,2,1; 1,2,3; 2,3,1; 3,1,2 may be changed by adding, for example, one or more 1,2,3 schedules. This would give added priority to streams 1 and 2 over stream 3.

The pseudo-random or random algorithms may also be modified to implement a priority scheme by having the random number generator assign packets from one stream to the first slot in the scheduling window with greater probability. A typical random number generator, for example, generates random numbers ranging between zero and one. If this range is divided equally among the various combinations of packets, each combination should be sent with equal probability. For example, in the exemplary system described having three streaming sources labeled 1, 2 and 3, there are six possible packet combinations: 1,2,3; 1,3,2; 2,3,1; 2,1,3; 3,1,2; and 3,2,1. If the random number generator provides numbers in a range that is equally divided among these six combinations, for example, 0-1/6. 1/6-2/6, 2/6-3/6, 3/6-4/6, 4/6-5/6 and 5/6 to 1, then packets from each source have an equal probability of being dropped. If, however, the combinations that start with stream 1 are given a larger portion of the range then they would experience fewer dropped packets. One exemplary assignment for the set of combinations described above may be 0-1/4, 1/4-1/2, 1/2-5/8, 5/8-6/8, 6/8-7/8 and 7/8-1. This assignment would give packets from stream 1 a lower likelihood of experiencing dropped packets while still ensuring that at least some packets from streams 2 and 3 are received.

It is contemplated that the subject invention may be implemented as computer software running on a general purpose computer. This computer software may be embodied in a computer readable carrier such as a magnetic or semiconductor memory, a magnetic or optical disc or in an audio, radio-frequency or optical carrier wave.

While the invention has been described in terms of exemplary embodiments, it is contemplated that it may be practiced as outlined above with modifications within the scope of the following claims.

What is claimed:

1. A method of transmitting a plurality of streams of packets through a computer network comprising:
   queuing the packets of the plurality of data streams in successive order for each stream for transmission through the computer network;
   assigning a higher priority to the queued packets in one of the plurality of streams relative to the queued packets in other of the plurality of streams;
   substantially randomly distributing the queued packets in each of the plurality of data streams to slots in scheduling windows including:
      providing a packet order for each transmission representing a relative order of the corresponding data streams; and
      varying substantially randomly the relative order of the corresponding data streams for respective transmissions;
   where the packet order corresponds to sequencing of packets within a data stream;
   where the relative order of the data streams corresponds to sequencing of the data streams relative to one another;
   where the queued packets in the one of the plurality of data streams having the higher priority are less likely to be dropped following reception of the respective transmissions due to being assigned a leading slot in respective ones of the scheduling windows with relatively greater probability than the queued packets in the other of the plurality of data streams while ensuring distributing at least some queued packets in the other of the plurality of data streams to at least some leading ones of the slots in other ones of the scheduling windows; and
   where two or more packets from the one of the plurality of streams are distributed to a particular slot in a particular scheduling window; and
   transmitting the queued packets through the computer network in an order defined by the substantially randomly distributing.

2. The method according to claim 1 where the substantially randomly distributing the queued packets of each of the plurality of data streams to the slots in the scheduling windows includes assigning multiple packets of the one of the plurality of data streams to one of the slots in at least one of the scheduling windows.

3. The method according to claim 1 where each scheduling window includes at least one slot for each of the plurality of data streams.

4. The method according to claim 3 where the substantially randomly distributing the queued packets from each of the plurality of data streams includes pseudo-randomly distributing the queued packets from each of the plurality of data streams to the slots of respective scheduling windows when one of the plurality of data streams is assigned a higher priority.

5. An apparatus for transmitting a plurality of streams of packets through a computer network comprising:
   respective packet queues to store the packets of the plurality of streams in successive order for each stream for transmission through the computer network;
   a packet scheduler, coupled to the packet queues, to substantially randomly assign the queued packets of each of the plurality of data streams to respective slots in scheduling windows including by:
      identifying a packet order for each transmission representing a relative order of the corresponding streams; and
      randomly varying the relative order of the corresponding streams for respective transmissions;
      where the packet order corresponds to sequencing of packets within a data stream;
      where the relative order of the data streams corresponds to sequencing of the data streams relative to one another;
      where the queued packets from one of the plurality of streams having a higher priority are less likely to be dropped following reception of the respective transmissions due to being assigned a leading slot in respective ones of the scheduling windows with relatively greater probability than the queued packets from other of the plurality of streams while ensuring assigning at least some queued packets from the other of the plurality of data streams to at least some leading ones of the slots in other ones of the scheduling windows; and
      where two or more packets from the one of the plurality of streams are distributed to a particular slot in a particular scheduling window; and
   a network interface to transmit the queued packets through the computer network in an order defined by the scheduling windows.

6. The apparatus according to claim 5 further including a random number generator, coupled to the packet scheduler, where each scheduling window includes at least one slot for each of the plurality of data streams and the packet scheduler is configured to substantially randomly assign the queued packets to respective slots in respective scheduling windows responsive to the random number generator.

7. The apparatus according to claim 6 where the random number generator includes a pseudo-random number generator.

8. A computer readable memory or disc including computer program instructions that cause a general purpose computer to implement a method of transmitting a plurality of streams of data packets through a computer network comprising:
   queuing the data packets of the plurality of data streams in successive order for each stream for transmission through the computer network;
   assigning a higher priority to the queued packets in one of the plurality of streams relative to the queued packets in other of the plurality of streams;
   substantially randomly distributing the queued packets in each of the plurality of data streams to slots in scheduling windows including:
      providing a packet order for each transmission representing a relative order of the corresponding data streams; and
      varying substantially randomly the relative order of the corresponding data streams for respective transmissions;
      where the packet order corresponds to sequencing of packets within a data stream;
      where the relative order of the data streams corresponds to sequencing of the data streams relative to one another;
      where the queued packets in the one of the plurality of data streams having the higher priority are less likely to be dropped following reception of the respective transmissions due to being assigned a leading slot in respective ones of the scheduling windows with relatively greater probability than the queued packets in the other of the plurality of data streams while ensuring distributing at least some queued packets in the other of the plurality of data streams to at least some leading ones of the slots in other ones of the scheduling windows; and
      where two or more packets from the one of the plurality of streams are distributed to a particular slot in a particular scheduling window; and
   serial-burst transmitting the queued packets through the computer network in an order defined by the scheduling windows such that an idle period of at least a predetermined interval separates the transmission of each serial burst corresponding to each scheduling window.

9. An apparatus, comprising:
   means for queuing the data packets of the plurality of data streams in successive order for each stream for transmission through the computer network;
   means for assigning a higher priority to the queued packets in one of the plurality of streams relative to the queued packets in other of the plurality of streams;
   means for substantially randomly distributing the queued packets in each of the plurality of data streams to slots in scheduling windows including:
   means for providing a packet order for each transmission representing a relative order of the corresponding data streams; and
   means for varying substantially randomly the relative order of the corresponding data streams for respective transmissions;
      where the packet order corresponds to sequencing of packets within a data stream;
      where the relative order of the data streams corresponds to sequencing of the data streams relative to one another;
      where the queued packets in the one of the plurality of data streams having the higher priority are less likely to be dropped following reception of the respective transmissions due to being assigned a leading slot in respective ones of the scheduling windows with relatively greater probability than the queued packets in the other of the plurality of data streams while ensuring distributing at least some queued packets in the other of the plurality of data streams to at least some leading ones of the slots in other ones of the scheduling windows; and
      where two or more packets from the one of the plurality of streams are distributed to a particular slot in a particular scheduling window; and
   means for transmitting the queued packets through the computer network in an order defined by the scheduling windows.

10. A scheduler configured to schedule respective packets received from a plurality of streaming sources for multiplex transmission, comprising:
   a plurality of input queues, wherein each input queue is configured to receive packets from a corresponding one of the plurality of streaming sources in accordance with an original sequencing of the packets and wherein each of the plurality of streaming sources is configured to have a priority relative to other of the plurality of streaming sources;

an input queue selector configured to select from each input queue at least one packet for assignment to a respective serial slot in each of a plurality of scheduling windows so that the packets in each scheduling window are arranged according to a scheduling scheme in an ordered sequence for transmission, wherein a number of serial slots in each scheduling window is at least equal to the plurality of streaming sources; and an output controller configured to transmit the packets assigned to each scheduling window in a serial burst so that an idle period of at least a predetermined interval separates the transmission of each serial burst corresponding to each scheduling window;

wherein the scheduling scheme is configured to operate so that:

relative to each slot of each respective window, a particular one of the input queues selected to contribute the at least one packet is selected pseudo-randomly;

relative to a first slot of each respective window, which first slot is the slot destined to be transmitted first by the output controller, the likelihood that a particular input queue will be selected to contribute the at least one packet increases as a priority of a corresponding one of the plurality of streaming source increases;

relative to the first slot of each respective window, there is at least some likelihood that each one of the input queues will be selected to contribute the at least one packet regardless of the priority of the corresponding one of the plurality of streaming sources of the contributing input queue; and wherein two or more packets from one of the input queues are distributed to a particular slot in a particular window.

11. The scheduler of claim 10 wherein the scheduling scheme is further configured to operate so that, relative to a given slot of each respective window, the likelihood that a particular input queue will be selected to contribute the at least one packet is reduced if the particular input queue has already contributed a packet to a respective slot of the respective window.

12. The scheduler of claim 10 wherein the number of serial slots in each scheduling window substantially equals a number of streaming sources.

13. The scheduler of claim 12 wherein the scheduling scheme is further configured to operate so that, relative to a given slot of each respective window, the likelihood that a particular input queue will be selected to contribute the at least one packet is reduced to zero if the particular input queue has already contributed a packet to a respective slot of the respective window.

* * * * *